(12) United States Patent
Grill et al.

(10) Patent No.: US 10,491,614 B2
(45) Date of Patent: Nov. 26, 2019

(54) ILLEGITIMATE TYPOSQUATTING DETECTION WITH INTERNET PROTOCOL INFORMATION

(71) Applicant: Cisco Technology, Inc., San Jose, CA (US)

(72) Inventors: Martin Grill, Prague (CZ); Jan Kohout, Roudnice nad Labem (CZ); Martin Kopp, Beroun (CZ); Tomas Pevny, Prague-Modrany (CZ)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 15/247,036

(22) Filed: Aug. 25, 2016

(65) Prior Publication Data

US 2018/0063174 A1 Mar. 1, 2018

(51) Int. Cl.
| | | |
|---|---|---|
| *H04L 29/06* | (2006.01) | |
| *H04L 29/08* | (2006.01) | |
| *H04L 29/12* | (2006.01) | |

(52) U.S. Cl.
CPC ...... *H04L 63/1425* (2013.01); *H04L 63/0236* (2013.01); *H04L 63/1441* (2013.01); *H04L 63/164* (2013.01); *H04L 67/02* (2013.01); *H04L 61/1511* (2013.01)

(58) Field of Classification Search
CPC .................................................. H04L 63/1425
USPC ........................................................ 726/23
See application file for complete search history.

(56) References Cited

U.S. PATENT DOCUMENTS

| | | | |
|---|---|---|---|
| 7,756,987 B2 | 7/2010 | Wang et al. | |
| 8,285,830 B1 * | 10/2012 | Stout ................... | H04L 63/1441 709/203 |
| 8,448,245 B2 | 5/2013 | Banerjee et al. | |
| 8,510,411 B2 | 8/2013 | Coulson et al. | |
| 8,893,286 B1 | 11/2014 | Oliver | |
| 2010/0042622 A1 * | 2/2010 | Matkowsky ........... | G06Q 10/00 707/769 |
| 2010/0235915 A1 * | 9/2010 | Memon ................. | H04L 63/145 726/23 |

OTHER PUBLICATIONS

Wang, Yi-Min, et al. "Strider Typo-Patrol: Discovery and Analysis of Systematic Typo-Squatting." SRUTI 6 (2006): 31-36.
Moore, Tyler, and Benjamin Edelman. "Measuring the perpetrators and funders of typosquatting." Financial Cryptography and Data Security. Springer Berlin Heidelberg, 2010. 175-191.

(Continued)

*Primary Examiner* — Jacob Lipman
(74) *Attorney, Agent, or Firm* — Edell, Shapiro & Finnan, LLC

(57) ABSTRACT

Detecting illegitimate typosquatting with Internet Protocol (IP) information includes, at a computing device having connectivity to a network, obtaining a list of domains and filtering the list to generate a list of monitored domain strings. IP information is passively determined for domains associated with each of the monitored domain strings. A domain requested in network traffic for the network is identified as a candidate typosquatting domain and the candidate typosquatting domain is determined to be an illegitimate typosquatting domain based at least on the IP information. An action is initiated related to the illegitimate typosquatting domain.

20 Claims, 5 Drawing Sheets

(56) References Cited

OTHER PUBLICATIONS

Agten, Pieter, et al. "Seven months' worth of mistakes: A longitudinal study of typosquatting abuse." Proceedings of the 22nd Network and Distributed System Security Symposium (NDSS 2015). Internet Society, 2015.

* cited by examiner

(12)	US 10,491,614 B2

ILLEGITIMATE TYPOSQUATTING DETECTION WITH INTERNET PROTOCOL INFORMATION

TECHNICAL FIELD

The present disclosure relates to network security and, in particular, to network security techniques for identifying malicious typosquatting.

BACKGROUND

Typosquatting, which is also referred to as Uniform Resource Locator (URL) hijacking, is a form of cybersquatting which relies on typographical mistakes, spelling mistakes, and other such mistakes made by Internet users when trying to visit a website. Cybersquatters may register typosquatting domains for malicious reasons (e.g., to provide a delivery mechanism for malware), for monetary reasons (e.g., to profit from displaying advertisements, to redirect traffic to third party pages, to try to sell the typosquatting domain name to the legitimate owner, etc.), some combination thereof (e.g., to deploy phishing sites or ransomware), or any other such motivation. Since the cost for domain registration has become relatively inexpensive, cost is rarely a deterrent.

Some web service providers are aware of typosquatting and, thus, may register or monitor many domains that might be used for typosquatting (e.g., common misspellings or typographical errors of an enterprise's name); however, it may be difficult to capture, register, and/or monitor every variation of an enterprise name. Consequently, variations of a domain name may contain both legitimate typosquatting domain names (e.g., those typosquatting domain names owned by an enterprise associated with the domain being typosquatted) and illegitimate typosquatting domain names (e.g., sting sites, fake URLs, or any other typosquatting domain names not owned by the enterprise and owned by typosquatters).

DESCRIPTION OF EXAMPLE EMBODIMENTS

Overview

Figure 1:
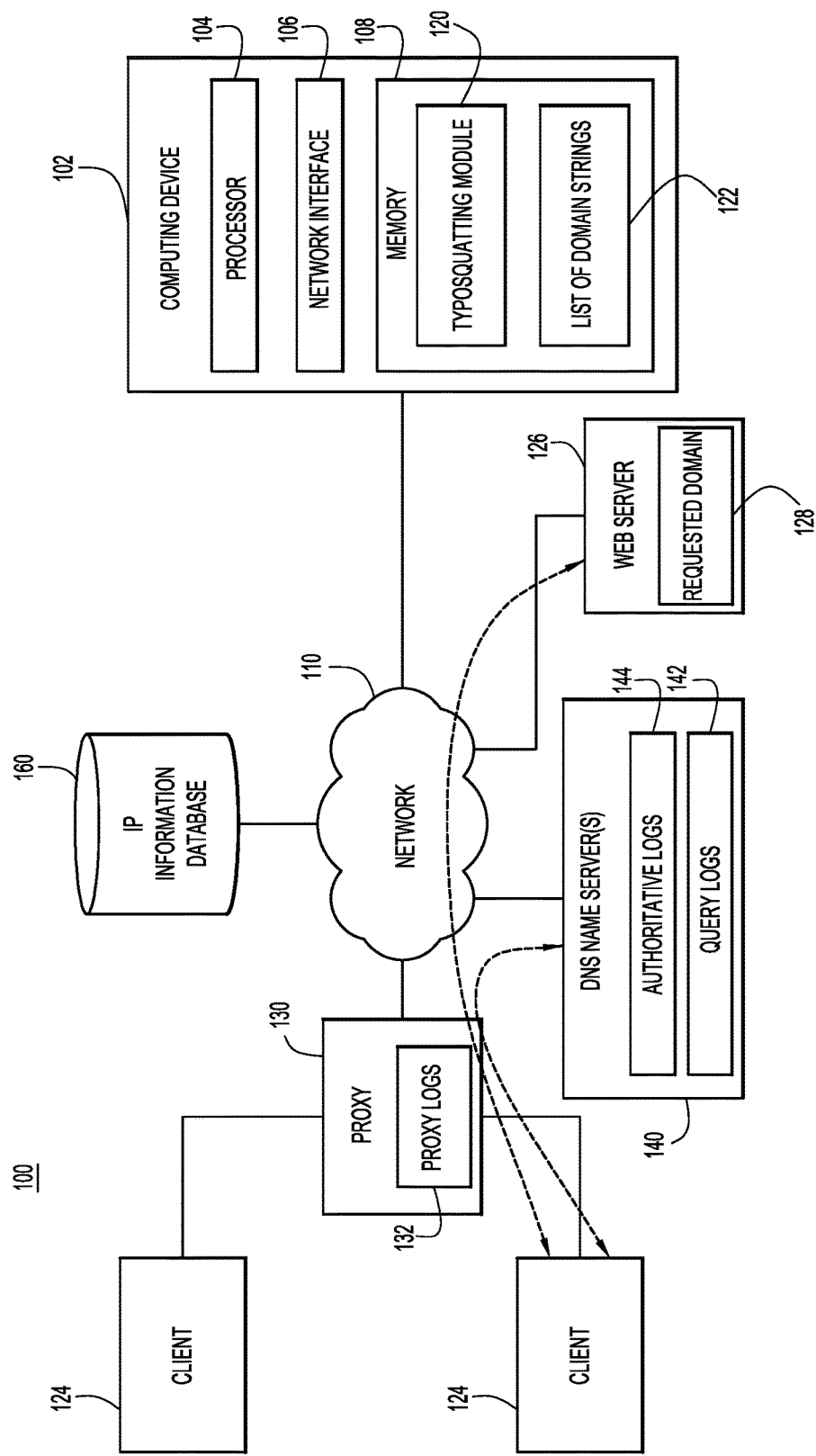
FIG. 1 is a block diagram illustrating a networking environment in which illegitimate typosquatting detection methods presented herein may be employed, according to an example embodiment.

Techniques are presented for illegitimate typosquatting detection with Internet Protocol (IP) information. These techniques may be embodied as a method, an apparatus, and instructions in a computer-readable storage media to perform the method. According to at least one example embodiment, detecting illegitimate typosquatting with Internet Protocol (IP) information includes, at a computing device having connectivity to a network, obtaining a list of domains and filtering the list to generate a list of monitored domain strings. IP information is passively determined for domains associated with each of the monitored domain strings. A domain requested in the network traffic for the network is identified as a candidate typosquatting domain and the candidate typosquatting domain is determined to be an illegitimate typosquatting domain based at least on the IP information. An action is initiated related to the illegitimate typosquatting domain.

Example Embodiments

The techniques presented herein detect illegitimate typosquatting while distinguishing the illegitimate typosquatting domains from legitimate typosquatting domains. Detection of illegitimate typosquatting domains can improve network security, both in terms of prevention and remediation. For example, when illegitimate typosquatting domains are properly distinguished from legitimate typosquatting domains, security solutions can more accurately control access to or within a network. Additionally, proper categorization of typosquatting domains may provide context when an infection is being analyzed. Generally, the techniques presented herein utilize Internet Protocol (IP) information, such as an IP address or Autonomous System Number (ASN) of a server responding to a Hypertext Transfer Protocol (HTTP) request for a particular web page, to evaluate and/or categorize typosquatting domains (e.g., to distinguish legitimate typosquatting domains from illegitimate typosquatting domains). However, the IP information is gathered passively, that is, without visiting the requested webpages. This removes, or at least reduces, the risk of infection while increasing the computational efficiency of the techniques (both in terms of time and resources needed). Moreover, since the techniques presented herein gather IP Information, the techniques may also be useful when attempting to determine the source of an infection.

By comparison, other typosquatting detection methods may detect typosquatting domains based on edit distance, which may be effective in detecting typographical and spelling errors. However, the edit distance provides no indication of whether the typosquatting domains are owned by the enterprise that owns the domain in question (e.g., whether the typosquatting domains are legitimate) and, thus, only provides limited value. For example, typosquatting domains should not be blacklisted if the domains are legitimate, so simply identifying a domain as a typosquatting domain without determining the legitimacy of the domain may not allow for proper blacklisting. Some solutions attempt to visit typosquatting domains identified by edit distance and/or evaluate the reputation of the identified typosquatting domains to determine if the identified typosquatting domains are illegitimate; however, these techniques may create exposure to malicious network threats and are time and resource intensive. Moreover, these techniques may not always reduce false positives (e.g., identifications of legitimate typosquatting domains as typosquatting domains), since visiting a typosquatting domain may not reveal the legitimacy of that domain.

Reference is now made to FIG. 1 for a description of a network environment 100 in which illegitimate typosquatting domains may be detected with at least IP information, according to an example embodiment. Networking environment 100 includes a computing device 102, such as a virtual server (e.g., hosted in the cloud) or a physical server, with a processor 104, a network interface 106, and a memory 108. The computing device 102, processor 104, network interface 106, and memory 108 are each described in further detail below in connection with FIG. 5; however, generally, the processor 104 may be configured to execute instructions stored in memory 108 and the network interface 106 (e.g., one or more network interface cards) may be configured to provide connectivity to a network, such as network 110. For example, the processor 104 may be configured to execute instructions stored in a typosquatting module 120 (which resides in the memory 108) in order to monitor traffic associated with (e.g., similar to) a list of domain strings 122 (also residing in memory 108) and detect illegitimate typosquatting domains in the network traffic.

In the particular embodiment depicted in FIG. 1, the computing device 102 is configured to receive or retrieve/access network traffic logs from a proxy server 130 and/or Domain Name System (DNS) name server 140 in order to monitor (e.g., based on instructions from typosquatting module 120) traffic in the network 110 between clients 124 and web servers 126 hosting requested domains 128. In particular, the proxy server 130 may maintain a proxy log 132 that may be or include HTTP access logs that log HTTP requests from clients 124 for specific web pages. Meanwhile, the name server 140 may maintain query logs 142 that log requests for a particular domain name received at a DNS name server 140 from a client 124 and the authoritative logs 144 may log request made to other authoritative name servers in response to the received queries. Collectively, the proxy logs 132, the query logs 142, and the authoritative logs 144 may be referred to as network traffic logs and may provide insight into the domains being requested by clients 124 in the network environment 100.

As is described in further detail below, before, as, or after the computing device 102 monitors network traffic logged in the network traffic logs, the computing device 102 may determine IP information for domains requested in the network traffic logs that are determined to be candidate typosquatting domains and/or associated with a domain string included in the list of domain strings (e.g., based on instructions from typosquatting module 120). In some embodiments, the network traffic logs, such as proxy log 132, may include the IP address of the web server 126 hosting a requested domain 128 and the computing device 102 may utilize publicly accessible databases, such as IP information database 160, to determine additional information, such as the Autonomous System Number (ASN) of the web server 126 hosting a requested candidate typosquatting domain. However, this is merely an example, and in other embodiments, the computing device 102 may determine any IP information related to a web server 126 hosting a requested domain 128 in any manner.

Moreover, in some embodiments, an IP address and ASN may be maintained for each domain string in the list of domain strings 122 by continuously updating the IP address and ASN associated with that string each time a domain including that string is observed in the network traffic logs. Consequently, after an initial period of time, a full set of IP addresses and ASNs of the servers that host domains associated with monitored domain strings may be created. Alternatively, the IP information of the domain strings 122 may be retrieved directly from the IP information database 160 (e.g., based on information included when the list 122 was obtained or created) or determined in any other manner.

Figure 2:
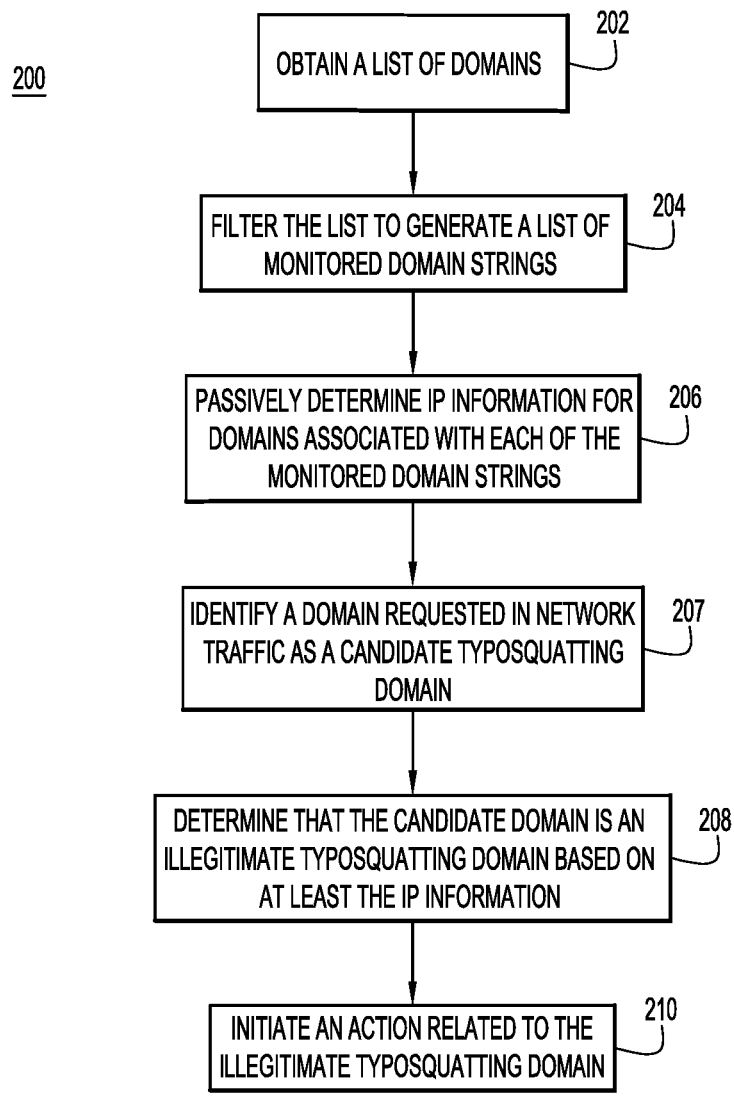
FIG. 2 is a high-level flowchart illustrating a process for detecting illegitimate typosquatting with Internet Protocol (IP) information, according to an example embodiment.

Now referring to FIG. 2, a high-level flowchart is now described of a method 200 for detecting illegitimate typosquatting with IP information. Initially, at step 202, a list of domains is retrieved, received, or otherwise obtained. The list may contain domains that are specific for a particular network (e.g., a list of domains to be monitored in a specific network) and/or domains that are likely to be typosquatted (e.g., the top N number of records from a list of the most popular domains). At step 204, the obtained list is filtered to generate a list of monitored domain strings (e.g. words or phrases included in a domain name). As is described in further detail below in connection with FIG. 3, in some embodiments, the filtering may focus the list on a specific domain name level (e.g., top level, second level, etc.) or apply a length threshold to the list of domains. Alternatively, in some embodiments, the list of domains obtained in step 202 need not be filtered and may be used in the format it is received, analyzed to retrieve the necessary information, or otherwise manipulated to create a list of domain strings.

Once or as a list of monitored domain strings is generated, IP information may be passively determined for each of the domain names at step 206. In this context, "passively" means that the IP information may be determined without visiting (e.g., crawling) the web pages associated with the domains on which the strings are based. Instead, network traffic logs maintained in the network (e.g., proxy logs 132 from FIG. 1) may be analyzed to determine at least some of the IP information for a particular domain name. Then, if additional information is needed, external sources (e.g., IP information database 160 from FIG. 1) may be analyzed. For example, the IP address of a server hosting a particular domain name may be retrieved from HTTP access logs maintained within a network and the IP address may be used to look up the ASN of the server in a publicly available database. In some embodiments, each time an HTTP request to a domain name including a domain string from the monitored list (e.g., a particular second level domain) is encountered, an IP address and an ASN may be retrieved and stored in association with the particular domain string. Consequently, over time, a set of IP addresses and ASNs is built and updated as different domain strings in the list of monitored domain strings are encountered or observed in domain requests. Consequently, after some initial time, a complete set of IP information (e.g. IP addresses and/or ASNs) can be gathered for the servers hosting domain names including the domain strings in the list of monitored domain strings.

Then, a domain requested in network traffic for the network may be identified as a candidate typosquatting domain at step 207. In some embodiments, network traffic may be monitored in real-time to identify a candidate typosquatting domain; however, in other embodiments, network traffic logged in a network traffic log (e.g., an HTTP access log) may be analyzed to identify a candidate typosquatting domain. Regardless, candidate typosquatting domains may be identified based on the request itself (e.g., the spelling or the requested domain), an edit distance from at least a portion of the requested domain to a domain string included in the list of domain strings, and/or IP information of a request, as is described in further detail in connection with FIG. 4. For example, in some embodiments, a requested domain may be selected as candidate typosquatting domain if the request for the domain included in the network traffic has a certain an edit distance, such as an edit distance of one, so that candidate typosquatting domains are different from, but sufficiently similar to a domain string in the list of monitored domain strings.

Moreover, when a candidate typosquatting domain is identified in network traffic, the candidate typosquatting domain can be evaluated in view of at least the IP information associated with the domain strings at step 208 to determine if the candidate typosquatting domain is legitimate or illegitimate. In at least some embodiments, the IP information of the candidate typosquatting domain and/or the IP information of the request for the candidate typosquatting domain is also considered, perhaps in comparison with the IP information associated with the domain strings. For example, when a candidate typosquatting domain appears in an HTTP request, the IP address and/or ASN of the server hosting the candidate typosquatting domain can be compared to the IP address and ASN associated with a similar string from the list of the monitored domain strings to determine if the typosquatting domain is legitimate or illegitimate. As a more specific example, if the string "cisco" is stored in the list of domain strings, IP information for cisco.com may be associated with the string cisco and ccisco.com, cisaco.com, ciscco.com, cisci.com, ciscoe.com, cisoco.com, and other such variations of the string cisco may be identified as candidate typosquatting domains (e.g., due to the edit distance between the string and the requested domains being one). Then, the IP information associated with the string "cisco" may be compared to the IP information of the candidate typosquatting domain names to determine whether the candidate typosquatting domains are legitimate. The evaluation techniques provided herein are described in further detail below in connection with FIG. 4, but, generally, serve to limit the number of false positives (e.g. legitimate typosquatting domains identified as illegitimate typosquatting domains).

At step 210, an action related to a candidate typosquatting domain may be initiated when the candidate typosquatting domain is determined to be an illegitimate typosquatting domain. In some embodiments, this may comprise generating and displaying an alert, such as within a security solution user interface. The alert may also be transmitted to a security administrator via email, a push notification, or any other communication method if desired. Since a user may have already visited an illegitimate typosquatting domain before it is identified with the techniques provided herein (since the HTTP requests may be obtained from proxy logs that record previous network traffic), the alert may provide information to a security administrator that allows the administrator to further investigate associated clients for possible infections. Additionally or alternatively, when a candidate typosquatting domain is determined to be an illegitimate typosquatting domain, the domain may be added to a blacklist and/or traffic to the domain may be blocked or redirected. For example, if the domain cisko.com is determined to be an illegitimate typosquatting domain, perhaps because this domain hosts an advertisement serving site, fake product reseller site, phishing site, or other third party or fraudulent site, cisko.com could be added to a blacklist and subsequent HTTP requests for cisko.com could be blocked or redirected to cisco.com. Alerts could also be sent and/or displayed to a security administrator so that the security administer is aware of the identified illegitimate typosquatting domains and the actions initiated in response to the identification. Still further, in some embodiments, if a candidate typosquatting domain is determined to be a legitimate domain (e.g., if cisko.com is owned by Cisco and HTTP requests for cisko.com are already redirected to cisco.com), the legitimate typosquatting domain can be added to a whitelist.

Figure 3:
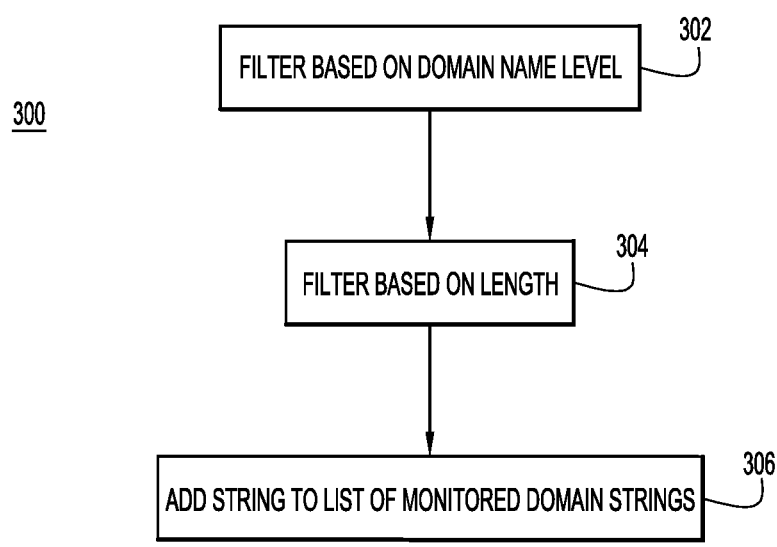
FIG. 3 is a flowchart illustrating a process for filtering a list of domains to generate a list of monitored domain strings, according to an example embodiment.

Now referring to FIG. 3, a flowchart is now described of a method 300 for filtering an obtained list of domains, according to an example embodiment. At step 302, the domains in the obtained list of domains may be filtered based on domain name level. For example, if the monitored domain names are second level domains, the top level domain may be stripped from every domain in the list of domains. However, this is merely an example, and in other embodiments, any domain name level could be stripped (e.g., removed) with this filtering. At step 304, the domains in the obtained list of domains may be filtered based on length. For example, in some embodiments, domains in the obtained list must satisfy (e.g., be shorter, smaller, or otherwise less than) a length threshold. For example, in at least one embodiment, second level domains from an obtained list must have at least five letters. Length filtering may reduce the number of false positives returned because it removes heavily populated, legitimate domains that are often quite similar from the list of monitored domains. For example, men.com and man.com only have only one letter that is different, but may each be legitimate.

At step 306, the string produced by the filtering may be added to the list of monitored domain strings. For example, if an obtained list includes the domains "cisco.com" and "CX.com," and the monitoring is set up for second level domain names, the top level domain name may be stripped off each domain name (e.g., step 302), reducing these domains to "cisco" and "CX." Then, CX may be removed from the list based on length filtering (e.g., step 304) and the string "cisco" may be added to the list of monitored domain strings (step 306). Alternatively, the length filtering could be applied first so that top level domains are not unnecessarily stripped. In some embodiments, filtering (by length, domain name level, or both) may unnecessarily or undesirably filter the domains included in the obtained list of domains. For example, if top level domains are being monitored, a length filter may be ineffective. Consequently, the filters may be adjustable, be able to be toggled on and off, or otherwise be reconfigurable for different situations. When the filters are removed, domains in an obtained list of domains may simply be processed and/or formatted in order to add strings to the list of monitored domain strings.

Figure 4:
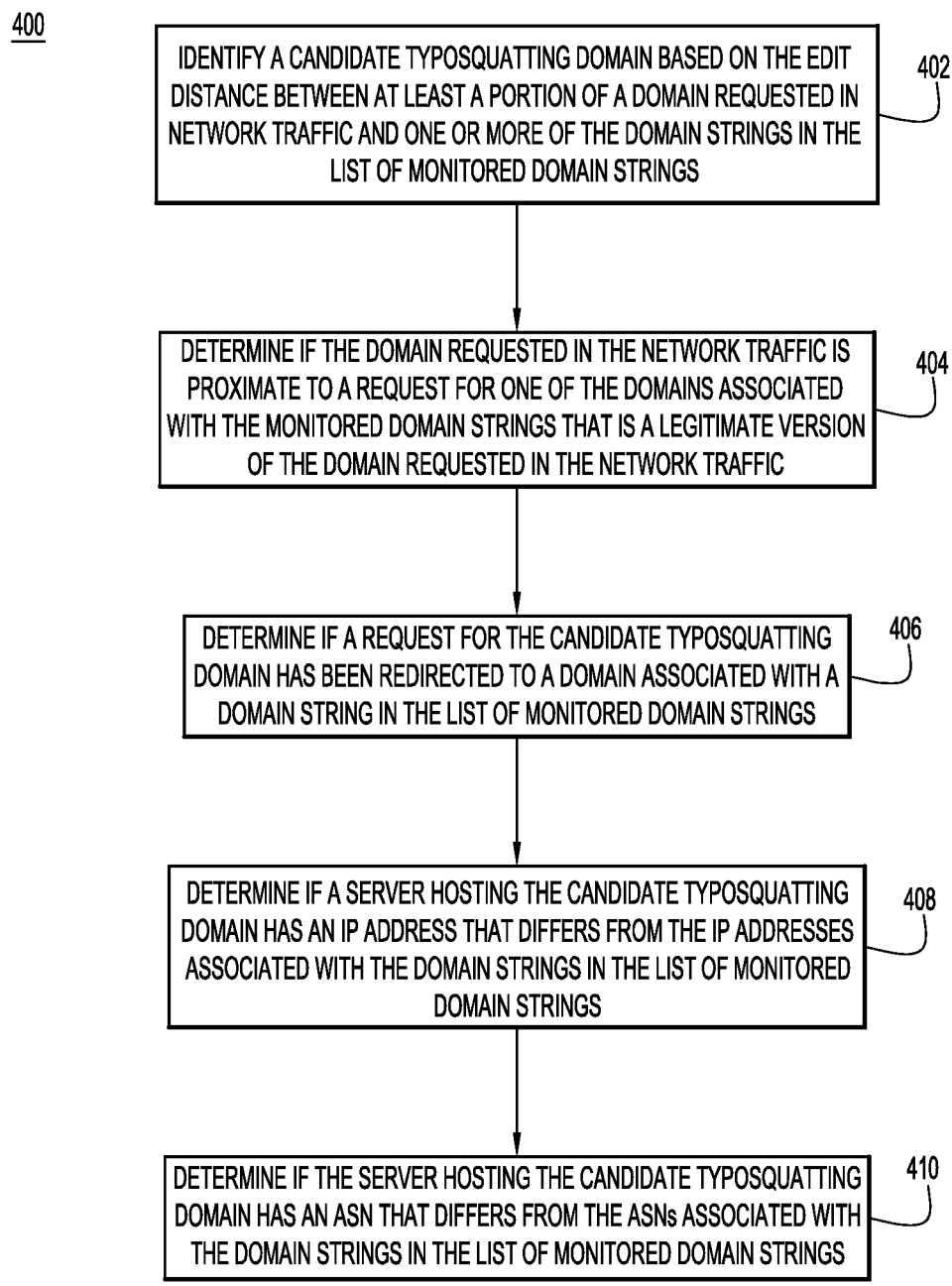
FIG. 4 is a flowchart illustrating a process for identifying and evaluating candidate typosquatting domains based on at least IP information, according to an example embodiment.

Now referring to FIG. 4, a flowchart is now described of a method 400 for identifying and determining the legitimacy of a candidate typosquatting domain in view of the IP information (e.g., as performed at steps 207 and 208 in FIG. 2, respectively). Generally, a candidate typosquatting domain may be identified (e.g., step 207) with steps 402 and/or 404 while the legitimacy of the candidate typosquatting domain may be determined (e.g., step 208) with steps 406, 408, and/or 410; however, in different embodiments, any subset or all of the steps included in method 400 may be performed in any order to identify and evaluate (e.g., determine the legitimacy of) a candidate typosquatting domain.

At step 402, candidate typosquatting domains are identified based on the edit distance (e.g., the Levenshtein distance, which the measures the minimum number of single-character edits, such as insertions, deletions, or substitutions, required to change one word into another) between at least a portion of a domain requested in network traffic and the domain strings in the list of monitored domain strings. For example, in some embodiments, if a domain name, or portion thereof, requested in network traffic has an edit distance of one with a domain string in the list of monitored domain strings, the requested domain may be considered a candidate typosquatting domain. However, in other embodiments, the required edit distance may be set to any threshold or number to identify candidate typosquatting domains. Once candidate typosquatting domains are identified, the candidate typosquatting domains can be evaluated in view of the passively determined IP information for the list of monitored domain strings, as well as IP information associated with the candidate typosquatting domain. In at least some embodiments, the edit distance may also be considered to determine legitimacy.

At step 404, a domain requested in the network traffic may be confirmed as a candidate typosquatting domain based on other requests in a network traffic log, such as a proxy log, in proximity to the request for the candidate typosquatting domain. In particular, a determination is made as to whether a request (e.g., a HTTP request) for a legitimate domain associated with the candidate typosquatting domain (e.g., the correctly spelled version of the candidate typosquatting domain, as determined via edit distance) is proximate the request for the candidate typosquatting domain in a network traffic log. Proximity may be determined based on a time threshold, a threshold number of requests, or any other criteria or threshold, and may indicate that the candidate typosquatting domain is indeed a typosquatting domain. For example, proximity may indicate that a user frequently visits the legitimate domain and, thus, the candidate typosquatting domain is likely a typographical or spelling error made when a user typed the domain name. As a more specific example, if a user requested cisco.com and then requested cisko.com a short time later, this may indicate that cisko.com was typed in error and, thus, cisko.com may be identified as a candidate typosquatting domain.

At step 406, the candidate typosquatting domain is evaluated based on whether the request for the candidate typosquatting domain has been redirected to a domain in the list of monitored names. In order to perform this evaluation, IP information for the request of the candidate typosquatting domain is retrieved and analyzed. For example, an HTTP redirect can be detected when a HTTP response header has the HTTP status field set to 3XX and the location of the redirect can be determined by analyzing the HTTP location field (e.g., to determine if the redirect is set to the correctly spelled domain). If the domain has been redirected to a domain associated with a string in the list of monitored domain strings, it may indicate that the owner of the domain also owns the candidate typosquatting domain as a legitimate typosquatting domain. For example, if cisko.com redirects to cisco.com, this may indicate that the owner of cisco.com (e.g., Cisco) also owns cisko.com as a legitimate typosquatting domain. By comparison, if cisko.com does not redirect to cisco.com, this may tend to indicate that the candidate typosquatting domain (cisko.com) is an illegitimate typosquatting domain.

At steps 408 and 410, the candidate typosquatting domain may be further evaluated based on the IP information of the candidate typosquatting domain and the IP information of the associated domain from the list of monitored domain strings. More specifically, at step 408, the IP address for the server hosting the candidate typosquatting domain may be compared to the IP addresses in the set of IP addresses for the list of monitored domain strings. Similarly, at step 410, the ASN for the server hosting the candidate typosquatting domain may be compared to the ASNs in the set of ASNs for the list of monitored domain strings. Additionally or alternatively, the IP address and/or ASN of the server hosting the candidate typosquatting domain may be compared to the IP address and/or ASN associated with the string from the list with the smallest edit distance to the candidate typosquatting domain (e.g., a correctly spelled string of the candidate typosquatting domain) to determine if the candidate typosquatting domain is hosted at the same IP address or in the same Autonomous System. Regardless, if a comparison reveals that the server hosting the candidate typosquatting domain has a different IP address or ASN (e.g., the IP address and/or ASN is not in the set of IP addresses and/or ASNs and/or differs from the IP information of the most similar string), the candidate typosquatting domain is likely an illegitimate typosquatting domain. If instead, the ASN and/or IP address is the same, this may indicate that the candidate typosquatting domain is a legitimate typosquatting domain.

Figure 5:
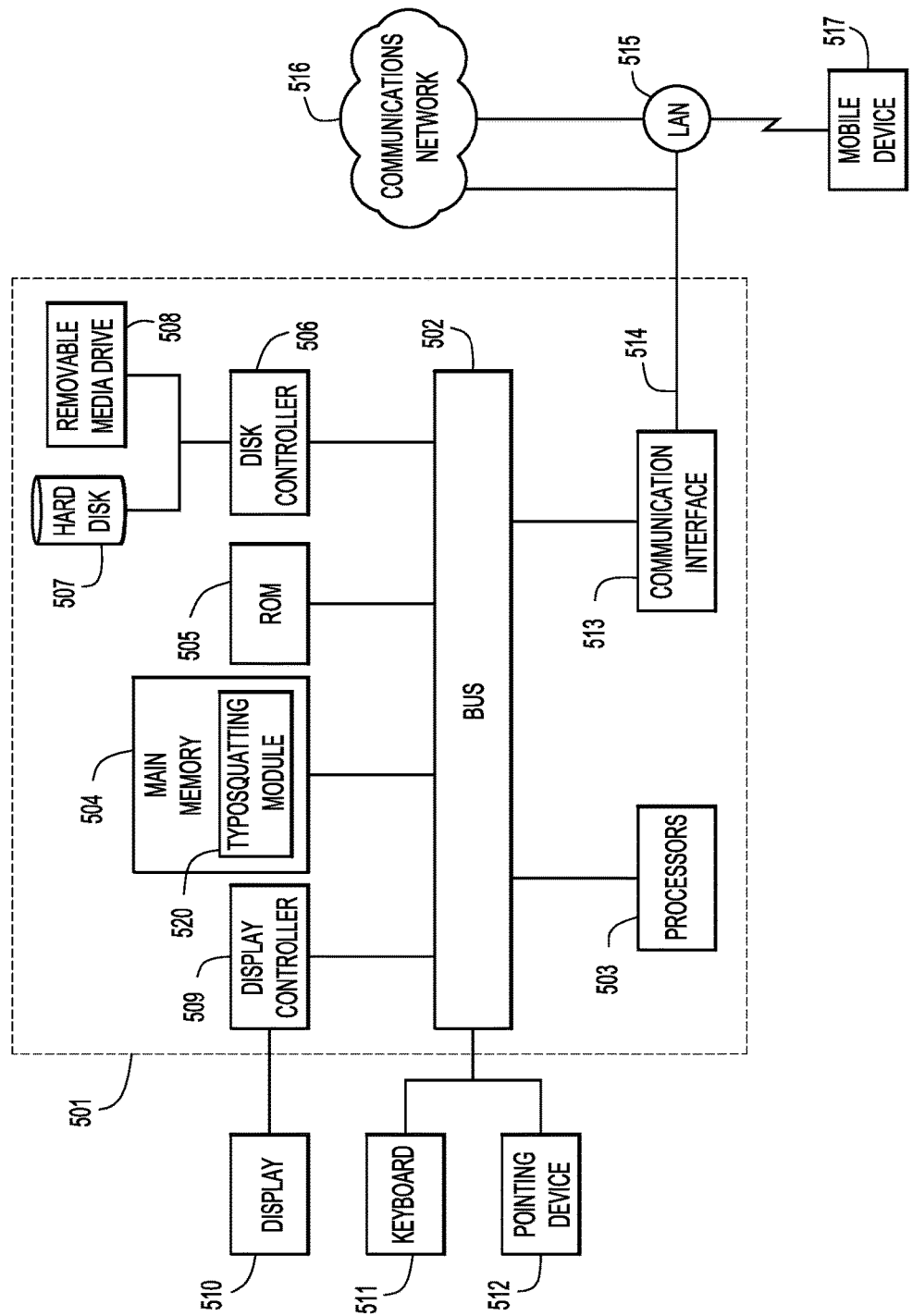
FIG. 5 is a simplified block diagram of a computing device that can be used to implement various embodiments of the disclosed technology, according to an example embodiment.

FIG. 5 illustrates an example hardware diagram of a computing apparatus 501, such as computing device 102 in FIG. 1, on which the techniques provided herein may be implemented. The apparatus 501 includes a bus 502 or other communication mechanism for communicating information, and processor(s) 503 coupled with the bus 502 for processing the information. While the figure shows a signal block 503 for a processor, it should be understood that the processors 503 represent a plurality of processing cores, each of which can perform separate processing. The apparatus 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors, may individually or collectively, act as processing circuitry. The processing circuitry may be located in one device or distributed across multiple devices.

The apparatus 501 also includes a main memory 505, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor(s) 503. The memory 505 stores CNIS software 520 that, when executed by the processor(s) 503, enables the computing apparatus 501 to perform the operations described herein. In addition, the main memory 505 may be used for storing temporary variables or other intermediate information during the execution of instructions by the processor 503. The apparatus 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The apparatus 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the apparatus 501 using an appropriate device interface (e.g., small computer system interface (SCSI), integrated device electronics (IDE), enhanced-IDE (E-IDE), direct memory access (DMA), or ultra-DMA). Thus, in general, the memory may comprise one or more tangible (non-transitory) computer readable storage media (e.g., a memory device) encoded with software comprising computer executable instructions and when the software is executed (by the processor) it is operable to perform the operations described herein.

The apparatus 501 may also include a display controller 109 coupled to the bus 502 to control a display 510, such as a cathode ray tube (CRT), for displaying information to a computer user. The computer system 501 may also include input devices, such as a keyboard 55 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the apparatus 501.

The apparatus 501 performs a portion or all of the processing steps presented herein in response to the processor 503 executing one or more sequences of one or more instructions contained in a memory, such as the main memory 505. Such instructions may be read into the main memory 505 from another computer readable medium, such as a hard disk 507 or a removable media drive 508. One or more processors in a multi-processing arrangement may also be employed to execute the sequences of instructions contained in main memory 505. In alternative embodiments, hard-wired circuitry may be used in place of or in combination with software instructions. Thus, embodiments are not limited to any specific combination of hardware circuitry and software.

As stated above, the apparatus 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the apparatus 501, for driving a device or devices for implementing the processing operations presented herein, and for enabling the apparatus 501 to interact with a human user (e.g., network engineers). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The apparatus 501 also includes a communication interface 513 coupled to the bus 502. The communication interface 513 provides a two-way data communication coupling to a network link 515 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 515 typically provides data communication through one or more networks to other data devices. For example, the network link 515 may provide a connection to another computer through a local are network 515 (e.g., a LAN) or through equipment operated by a service provider, which provides communication services through a communications network 516. The local network 515 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 515 and through the communication interface 513, which carry the digital data to and from the apparatus 501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The apparatus 501 can transmit and receive data, including program code, through the network(s) 515 and 516, the network link 515 and the communication interface 513. Moreover, the network link 1215 may provide a connection through a LAN 515 to a mobile device 517 such as a personal digital assistant (PDA) laptop computer, or cellular telephone.

The techniques presented herein provide a number of advantages. As one example, since the techniques presented herein retrieve necessary information (e.g., IP information) passively, the techniques limit exposure to potentially malicious websites. Passive information gathering also reduces the computing load and, thus, allows for increased efficiency, in terms of both time and resources. As another example, the techniques drastically reduce the number of false positives since the techniques can accurately identify both illegitimate and legitimate typosquatting domains, even without visiting the web sites of the candidate typosquatting domains.

To summarize, in one form, a method is provided comprising: at a computing device having connectivity to a network, obtaining a list of domains; filtering the list to generate a list of monitored domain strings; passively determining Internet Protocol (IP) information for domains associated with each of the monitored domain strings; identifying a domain requested in network traffic for the network as a candidate typosquatting domain; determining that the candidate typosquatting domain is an illegitimate typosquatting domain based at least on the IP information; and initiating an action related to the illegitimate typosquatting domain.

In another form, an apparatus is provided comprising: one or more network interface units configured to enable network connectivity to a network; and a processor configured to: obtain a list of domains; filter the list to generate a list of monitored domain strings; passively determine Internet Protocol (IP) information for domains associated with each of the monitored domain strings; identifying a domain requested in network traffic for the network as a candidate typosquatting domain; determine that the candidate typosquatting domain is an illegitimate typosquatting domain based at least on the IP information; and initiate an action related to the illegitimate typosquatting domain.

In yet another form, a non-transitory computer-readable storage media encoded with software comprising computer executable instructions is provided and when the software is executed operable to: obtain a list of domains; filter the list to generate a list of monitored domain strings; passively determine Internet Protocol (IP) information for domains associated with each of the monitored domain strings; identifying a domain requested in network traffic for a network as a candidate typosquatting domain; determine that the candidate typosquatting domain is an illegitimate typosquatting domain based at least on the IP information; and initiate an action related to the illegitimate typosquatting domain.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a computing device having connectivity to a network, obtaining a list of domains;
filtering the list to generate a list of monitored domain strings;
passively determining Internet Protocol (IP) information for domains associated with each of the monitored domain strings by analyzing network traffic logs maintained in the network;
identifying a domain requested in network traffic for the network as a candidate typosquatting domain, wherein identifying the candidate typosquatting domain comprises determining that a request for the candidate typosquatting domain is within a threshold time proximity, in the network traffic logs, to a request for one of the domains associated with the monitored domain strings that is a legitimate version of the candidate typosquatting domain;
determining that the candidate typosquatting domain is an illegitimate typosquatting domain based at least on the IP information; and
initiating an action related to the illegitimate typosquatting domain.

2. The method of claim 1, wherein filtering comprises:
filtering the list of domains based on at least one of a predetermined length of a domain string and a predetermined domain name level.

3. The method of claim 1, wherein initiating an action comprises at least one of:
generating an alert message; and
adding the candidate typosquatting domain to a blacklist so that future requests for the candidate typosquatting domain are automatically blocked or redirected to a legitimate domain including a domain string in the list of monitored domain strings.

4. The method of claim 1, further comprising:
identifying the candidate typosquatting domain when a request for the candidate typosquatting domain is detected in the network traffic logs.

5. The method of claim 4, wherein identifying the candidate typosquatting domain further comprises:
determining that an edit distance between at least a portion of the candidate typosquatting domain and one or more of the monitored domain strings in the list of monitored domain strings is less than a predetermined threshold.

6. The method of claim 1, wherein determining that a candidate typosquatting domain is an illegitimate typosquatting domain further comprises:
retrieving IP information for a server hosting the candidate typosquatting domain and the request for the candidate typosquatting domain;
determining, based on the IP information of the request for the candidate typosquatting domain, that the request for the candidate typosquatting domain is not redirected to a domain including a domain string from the list of monitored domain strings; and
determining, based on the IP information of the server hosting the candidate typosquatting domain, that the server hosting the candidate typosquatting domain has IP information that differs from the IP information for domain strings in the list of monitored domain strings.

7. The method of claim 6, wherein the IP information for the monitored domain strings comprises at least one of:
an IP address of a server handling a request for one of the domains associated with the monitored domain strings; and
an Autonomous System Number (ASN) of the server.

8. An apparatus comprising:
one or more network interface units configured to enable network connectivity to a network; and
a processor configured to:
obtain a list of domains;
filter the list to generate a list of monitored domain strings;
passively determine Internet Protocol (IP) information for domains associated with each of the monitored domain strings by analyzing network traffic logs maintained in the network;
identify a domain requested in network traffic for the network as a candidate typosquatting domain by determining that a request for the candidate typosquatting domain is within a threshold time proximity, in the network traffic logs, to a request for one of the domains associated with the monitored domain strings that is a legitimate version of the candidate typosquatting domain;
determine that the candidate typosquatting domain is an illegitimate typosquatting domain based at least on the IP information; and
initiate an action related to the illegitimate typosquatting domain.

9. The apparatus of claim 8, wherein, in filtering, the processor is configured to:
filter the list of domains based on at least one of a predetermined length of a domain string and a predetermined domain name level.

10. The apparatus of claim 8, wherein in initiating an action, the processor is further configured to perform least one of:
generate an alert message; and
add the candidate typosquatting domain to a blacklist so that future requests for the candidate typosquatting domain are automatically blocked or redirected to a legitimate domain including a domain string in the list of monitored domain strings.

11. The apparatus of claim 8, wherein the processor is further configured to:
   identify the candidate typosquatting domain when a request for the candidate typosquatting domain is detected in the network traffic logs.

12. The apparatus of claim 11, wherein, in identifying the candidate typosquatting domain, the processor is further configured to
   determine that an edit distance between at least a portion of the candidate typosquatting domain and one or more of the monitored domain strings in the list of monitored domain strings is less than a predetermined threshold.

13. The apparatus of claim 8, wherein in determining that a candidate typosquatting domain is an illegitimate typosquatting domain, the processor is further configured to:
   retrieve IP information for a server hosting the candidate typosquatting domain and the request for the candidate typosquatting domain;
   determine, based on the IP information of the request for the candidate typosquatting domain, that the request for the candidate typosquatting domain is not redirected to a domain including a domain string from the list of monitored domain strings; and
   determine, based on the IP information of the server hosting the candidate typosquatting domain, that the server hosting the candidate typosquatting domain has IP information that differs from the IP information for domain strings in the list of monitored domain strings.

14. The apparatus of claim 13, wherein the IP information for the monitored domain strings comprises at least one of:
   an IP address of a server handling a request for one of the domains associated with the monitored domain strings; and
   an Autonomous System Number (ASN) of the server.

15. A non-transitory computer-readable storage media encoded with software comprising computer executable instructions and when the software is executed operable to:
   obtain a list of domains;
   filter the list to generate a list of monitored domain strings;
   passively determine Internet Protocol (IP) information for domains associated with each of the monitored domain strings by analyzing network traffic logs maintained in a network;
   identify a domain requested in network traffic for a network as a candidate typosquatting domain by determining that a request for the candidate typosquatting domain is within a threshold time proximity, in the network traffic logs, to a request for one of the domains associated with the monitored domain strings that is a legitimate version of the candidate typosquatting domain;
   determine that the candidate typosquatting domain is an illegitimate typosquatting domain based at least on the IP information; and
   initiate an action related to the illegitimate typosquatting domain.

16. The non-transitory computer-readable storage media of claim 15, wherein the instructions operable to filter comprise instructions operable to:
   filter the list of domains based on at least one of a predetermined length of a domain string and a predetermined domain name level.

17. The non-transitory computer-readable storage media of claim 15, wherein the instructions further comprise instructions operable to:
   identify the candidate typosquatting domain when a request for the candidate typosquatting domain is detected in the network traffic logs by
      determining that an edit distance between at least a portion of the candidate typosquatting domain and one or more of the monitored domain strings in the list of monitored domain strings is less than a predetermined threshold.

18. The non-transitory computer-readable storage media of claim 15, wherein the instructions operable to initiate an action, further comprise instructions operable to:
   generate an alert message; and
   add the candidate typosquatting domain to a blacklist so that future requests for the candidate typosquatting domain are automatically blocked or redirected to a legitimate domain including a domain string in the list of monitored domain strings.

19. The non-transitory computer-readable storage media of claim 15, wherein the instructions operable to determine that a candidate typosquatting domain is an illegitimate typosquatting domain further comprises instructions operable to:
   retrieve IP information for a server hosting the candidate typosquatting domain and the request for the candidate typosquatting domain;
   determine, based on the IP information of the request for the candidate typosquatting domain, that the request for the candidate typosquatting domain is not redirected to a domain including a domain string from the list of monitored domain strings; and
   determine, based on the IP information of the server hosting the candidate typosquatting domain, that the server hosting the candidate typosquatting domain has IP information that differs from the IP information for domain strings in the list of monitored domain strings.

20. The non-transitory computer-readable storage media of claim 19, wherein the IP information for the monitored domain strings comprises at least one of:
   an IP address of a server handling a request for one of the domains associated with the monitored domain strings; and
   an Autonomous System Number (ASN) of the server.

* * * * *